(12) United States Patent
Park et al.

(10) Patent No.: US 9,485,026 B2
(45) Date of Patent: Nov. 1, 2016

(54) SCHEME FOR REMOTE CONTROL OF THE WAVELENGTH OF A TUNABLE TRANSMITTER IN A SMART TRANSCEIVER

(75) Inventors: Kwang Soo Park, Tinton Falls, NJ (US); Moon Soo Park, Gwangju (KR)

(73) Assignee: OE SOLUTIONS CO., LTD., Gwangju (KR)

( * ) Notice: Subject to any disclaimer, the term of this patent is extended or adjusted under 35 U.S.C. 154(b) by 0 days.

(21) Appl. No.: 13/235,316

(22) Filed: Sep. 16, 2011

(65) Prior Publication Data

US 2013/0071108 A1    Mar. 21, 2013

(51) Int. Cl.
*H04B 10/40* (2013.01)
*H04B 10/572* (2013.01)

(52) U.S. Cl.
CPC ........... *H04B 10/40* (2013.01); *H04B 10/572* (2013.01)

(58) Field of Classification Search
CPC ............ H04Q 2011/0081; H04Q 2011/0079; H04B 10/08; H04B 10/43; H04B 10/40; H04B 2210/072; H04B 10/572; H04J 14/0227
USPC .............. 398/106–114, 135–139, 27, 32, 26, 398/140–172
See application file for complete search history.

(56) References Cited

U.S. PATENT DOCUMENTS

| | | | | |
|---|---|---|---|---|
| 4,957,339 A * | 9/1990 | Fussganger et al. | ........... | 398/82 |
| 5,317,440 A * | 5/1994 | Hsu | ................... | 398/41 |
| 5,654,816 A * | 8/1997 | Fishman | ....................... | 359/349 |
| 5,673,129 A * | 9/1997 | Mizrahi | ........................ | 398/95 |
| 5,731,887 A * | 3/1998 | Fee | .................... | 398/5 |
| 6,339,487 B1 * | 1/2002 | Gnauck et al. | ................. | 398/42 |
| 6,567,198 B1 * | 5/2003 | Kang | ............................... | 398/91 |
| 7,016,608 B1 * | 3/2006 | Ball et al. | ....................... | 398/71 |
| 7,020,092 B1 * | 3/2006 | Weiske et al. | ................ | 370/252 |
| 7,093,172 B2 * | 8/2006 | Fan | ........................ | H04L 1/241 370/249 |
| 7,440,701 B2 * | 10/2008 | Li et al. | ......................... | 398/135 |
| 7,599,618 B2 * | 10/2009 | Adam et al. | .................... | 398/16 |
| 7,885,543 B2 * | 2/2011 | Chen et al. | ...................... | 398/72 |
| 7,933,518 B2 * | 4/2011 | Li et al. | ........................... | 398/22 |
| 8,014,672 B2 * | 9/2011 | Suzuki | ............... | H04B 10/0793 398/135 |
| 8,331,783 B2 * | 12/2012 | Ikai | ........................ | H04J 14/02 398/69 |
| 8,660,437 B1 * | 2/2014 | Blauvelt | .......... | H04B 10/07957 398/136 |
| 2003/0149921 A1 * | 8/2003 | Lau | ......................... | H04L 1/243 714/704 |

(Continued)

OTHER PUBLICATIONS

Santanu et al, Beat Interference Penalty in Optical Duplex Transmission, Feb. 2002, Joural of Lightwave technology, vol. 20 No. 2, pp. 213-217.*

(Continued)

*Primary Examiner* — Ken N Vanderpuye
*Assistant Examiner* — Dibson Sanchez
(74) *Attorney, Agent, or Firm* — Arent Fox LLP

(57) ABSTRACT

A scheme is described for remote control of the wavelength of a tunable transmitter in a smart small form-factor pluggable (SFP) transceiver, a smart SFP plus (SFP+) transceiver, a smart 10 gigabit small form-factor pluggable (XFP) transceiver, a smart duplex transceiver, a smart bidirectional (BiDi) transceiver, or a smart single wavelength single fiber (SWSF) BiDi-transceiver in a communication system using an operating system with Operation, Administration, and Maintenance (OAM) and Proprietary Protocol (PP) functions; an OAM, PP & Payload Processor; a transceiver; an optical spectrum analyzer; a bit error rate test (BERT); and an optical link in the field.

22 Claims, 3 Drawing Sheets

Configuration for a Scheme of Remote Control of the Wavelength of a Transmitter in a Smart Duplex Transceiver

(56) References Cited

U.S. PATENT DOCUMENTS

| | | | |
|---|---|---|---|
| 2003/0165286 A1* | 9/2003 | Ikushima | H04B 10/00 385/24 |
| 2004/0179855 A1* | 9/2004 | Harada | H04J 14/02 398/197 |
| 2004/0225951 A1* | 11/2004 | Rose et al. | 714/819 |
| 2005/0089334 A1* | 4/2005 | Regev | H04B 10/672 398/139 |
| 2005/0123300 A1* | 6/2005 | Kim et al. | 398/84 |
| 2005/0213979 A1* | 9/2005 | Nakashima | H04B 10/07 398/79 |
| 2005/0265725 A1* | 12/2005 | Okano et al. | 398/147 |
| 2006/0013588 A1* | 1/2006 | Lautenschlager | 398/85 |
| 2006/0115271 A1* | 6/2006 | Hwang et al. | 398/72 |
| 2007/0109974 A1* | 5/2007 | Cutillo et al. | 370/254 |
| 2008/0089693 A1* | 4/2008 | El-Ahmadi et al. | 398/135 |
| 2008/0089699 A1* | 4/2008 | Li et al. | 398/197 |
| 2008/0267627 A1* | 10/2008 | Effenberger | 398/72 |
| 2009/0080889 A1* | 3/2009 | Nozue et al. | 398/69 |
| 2009/0113258 A1* | 4/2009 | Parthasarathy | G01R 31/31716 714/716 |
| 2009/0116845 A1* | 5/2009 | Li et al. | 398/135 |
| 2009/0154918 A1* | 6/2009 | Hinderthuer et al. | 398/9 |
| 2009/0263129 A1* | 10/2009 | Draer et al. | 398/51 |
| 2009/0269076 A1* | 10/2009 | Cai et al. | 398/135 |
| 2009/0304384 A1* | 12/2009 | Li | 398/58 |
| 2010/0002587 A1* | 1/2010 | Ray Noble et al. | 370/241 |
| 2010/0098413 A1* | 4/2010 | Li et al. | 398/38 |
| 2011/0229129 A1* | 9/2011 | Hu et al. | 398/34 |
| 2011/0236017 A1* | 9/2011 | Ohlen | 398/34 |
| 2012/0170927 A1* | 7/2012 | Huang | H04B 10/0795 398/20 |
| 2012/0183297 A1* | 7/2012 | Rohde et al. | 398/90 |
| 2013/0251362 A1* | 9/2013 | Li et al. | 398/25 |

OTHER PUBLICATIONS

Farrell, School of Electronic and Communications Engineering, Jan. 2002, Dublin Institute of Technology, pp. 1-16.*

* cited by examiner

Figure 1. Configuration for a Scheme of Remote Control of the Wavelength of a Transmitter in a Smart Duplex Transceiver Figure 2. Functional Block Diagram of a Smart SFP

SCHEME FOR REMOTE CONTROL OF THE WAVELENGTH OF A TUNABLE TRANSMITTER IN A SMART TRANSCEIVER

FIELD

Embodiments of the invention relate to a scheme for remote control of an electro-optical parameter of a smart transceiver in an optical fiber communication system, and more particularly, a scheme for remote control of the wavelength of a tunable transmitter in a smart transceiver. The applications of embodiments of the present invention include a smart transceiver installed in communication systems without optical amplifiers as well as optically amplified wavelength division multiplexing (WDM) communication systems, for example, such as long-haul transmission networks, access networks of fiber to the x (FTTx), passive optical networks (PON), and wireless backhauls between a base station (BTS) and an antenna tower or a remote radio head (RRH), but not limited only to these systems. A smart transceiver is an intelligent transceiver which can execute Ethernet in the First Mile Operation, Administration, and Maintenance (EFM OAM) functions specified in IEEE 802.3ah, including an electrical loopback configuration and the proprietary protocol (PP) functions. The type of the smart transceiver includes a smart small form-factor pluggable (SFP) transceiver, a smart small form factor pluggable plus (SFP+) transceiver, and a smart 10 gigabit small form-factor pluggable (XFP) transceiver, and a Duplex smart transceiver as well as conventional two-wavelength bidirectional (BiDi) smart transceiver and single wavelength, single fiber bidirectional (SWSF BiDi) smart transceiver, all of which are tunable.

BACKGROUND

An ability to tune the wavelength of a tunable transmitter in a transceiver from a remote site is very desirable for the following applications: 1) the mitigation of the interferometric beat noises (IBN) by avoiding the overlap of the wavelengths of two transmitters in a link where there are finite optical reflections along the link and SWSF BiDi smart transceivers are used, and 2) the link optimization of individual channel of a WDM communication system using duplex type smart transceivers or conventional two-wavelength BiDi smart transceivers.

For an optical link using SWSF BiDi transceivers in non-WDM communication systems or WDM, including conventional WDM or dense WDM (CWDM or DWDM) communication systems, the IBN generated, during optical to electrical (O/E) conversion at an optical receiver, between the optical spectral components of the intended signal from one transmitter and the optical spectral components of the unwanted, reflected signal of the other transmitter along the optical link will interfere with an intended signal and degrade signal to noise ratio (S/N) of the intended signal such that the communication optical link may not work properly, or even may be shut down; the IBN becomes biggest when the spectral components of two transmitters are overlapping on each other's. To suppress this IBN, there are two options: 1) Option #1, use of angled polished connectors (APCs) wherever physical connections with connectors are needed along the optical link to minimize the optical reflection at the connection, and 2) Option #2, use of the wavelength of one transmitter which is outside of the wavelength spectra of the other transmitter in the link while allowing the reflections along the optical link. The Option #1 might be neither practical nor appealing to network owners or service providers, considering that 1) almost all the connectors of currently deployed outside plant (OSP) link fibers are polished or ultra polished type connectors (PC or UPC) where an air gap between two connectors at the connection is always possible causing 13 dB to 14 dB of optical reflection and converting all these PC or UPC connectors into APC connectors will be quite expensive, 2) owners of OSP link fibers might not be interested in replacing all the PC or UPC connectors with APC connectors to lease the OSP fibers to the customers, and 3) transceivers with APC connectors cost more than those with PC or UPC connectors. The Option #2, however, is expected to be very attractive to network owners or service providers since this approach allows finite reflections along the optical link and does not require any specific type of connectors such as APC connectors; this offers network owners or service providers, for the first time, their own choice of selection of connector type in their communication systems using SWSF BiDi transceivers while taking full advantage of all the merits of the SWSF BiDi transceivers. With this Option #2, the mitigation of the IBN can be achieved through tuning the wavelength of transmitters such that the wavelength spectra of a transmitter of the SWSF BiDi transceiver at one end of the optical link is not overlapping the wavelength spectra of a transmitter of the SWSF BiDi transceiver at the other end of the optical link. This is particularly important when there are finite optical reflections along the optical link, and the difference in received optical power level, at an optical receiver, between the intended signal and the reflected signal is less than 13 dB.

For an optical link using transceivers other than SWSF BiDi transceivers in a WDM (CWDM or DWDM) communication system which is composed of, at both ends of a link, conventional duplex type transceivers (or two-wavelength BiDi transceivers) with a specific wavelength for individual channel of the link, an optical MUX, a link optical fiber, and an optical DEMUX, it is not rare that a service provider encounters occasions of deploying a transceiver the transmitter wavelength of which, set initially by the transceiver supplier, might not be at the center or the optimum of the composite wavelength bandwidth of the optical MUX and DEMUX along each channel. This would result in the link budget very tight without much available operational system margin which must be allocated for any robust communication system, whereas the optimization of wavelength of the transmitter of the transceiver could help each channel of the WDM link with an extra operational system margin.

Certain communication systems, therefore, will benefit with a transceiver which is equipped with the adjustability of the wavelength of a transmitter in the transceiver as described above. Since 1) a communication system consists of, at least, two transceivers where the transmitter of one transceiver is transmitting a signal to the receiver of another transceiver, and 2) the optimum wavelength of each transmitter depends solely on the system in which the transceiver is operating, the controllability of the wavelength of the transmitter in one transceiver by another transceiver will be a desirable feature. This is particularly true if two transceivers are physically separated far away from each other. In other words, a remote controllability of the wavelength of a tunable transmitter of one transceiver by another transceiver will be very valuable, considering the facts that 1) the adjustment of its wavelength can be executed by the technician at the CO where all the necessary test equipments are accessible easily and 2) another technician does not have to be present simultaneously at the site of the transceiver which is in need of adjustment of its wavelength; this will save a lot of capital and operating expenditures (CAFEX and OPEX) by the service provider/operator. This necessitates a new, novel approach to achieve this remote controllability of the wavelength of a tunable transmitter in a transceiver.

SUMMARY

According to embodiments of the present invention, a scheme for remote control of the wavelength of a tunable transmitter in a smart transceiver may comprise a smart transceiver at a first end of the optical link, the optical link, a transceiver, an OAM, PP & Payload processor, an operating system with the OAM and the PP functions, an optical spectrum analyzer at a second end of the optical link, and a Bit Error Rate Tester (BERT). A PP similar to OAM Protocol Data Unit (OAMPDU) of EFM OAM is a message protocol of changing or monitoring the wavelength of the tunable transmitter in the smart transceiver.

According to embodiments of the present invention, a smart transceiver at a first end of the optical link can perform the EFM OAM and the PP functions in passive mode including the electrical loopback and the PP functions. The smart transceiver is equipped with 1) a circuitry which can adjust the wavelength of the tunable transmitter and 2) a circuitry which can measure a certain parameter of the Tx representing the wavelength of the Tx indirectly in the smart transceiver upon receiving a commanding message in PP from the transceiver at a second end of the optical link. The type of the smart transceiver may be a smart SFP transceiver, a smart SFP+ transceiver, a smart XFP transceiver, a smart Duplex transceiver, a smart conventional BiDi transceiver, or a smart SWSF BiDi transceiver.

According to embodiments of the present invention, an optical link may comprise an optical multiplexer (MUX), optical amplifier(s), optical fiber(s), and an optical demultiplexer (DEMUR).

According to embodiments of the present invention, a transceiver at a second end of the optical link can perform the EFM OAM and the PP in active mode. This transceiver can send out a commanding message of the adjustment or measurement of the wavelength of the transmitter in the smart transceiver in a first end of the optical link using a PP.

BRIEF DESCRIPTION OF THE DRAWINGS

Embodiments of the present invention are illustrated by way of example and not limitation in the figures of the accompanying drawings, in which like references indicate similar elements.

DETAILED DESCRIPTION

Figure 1:
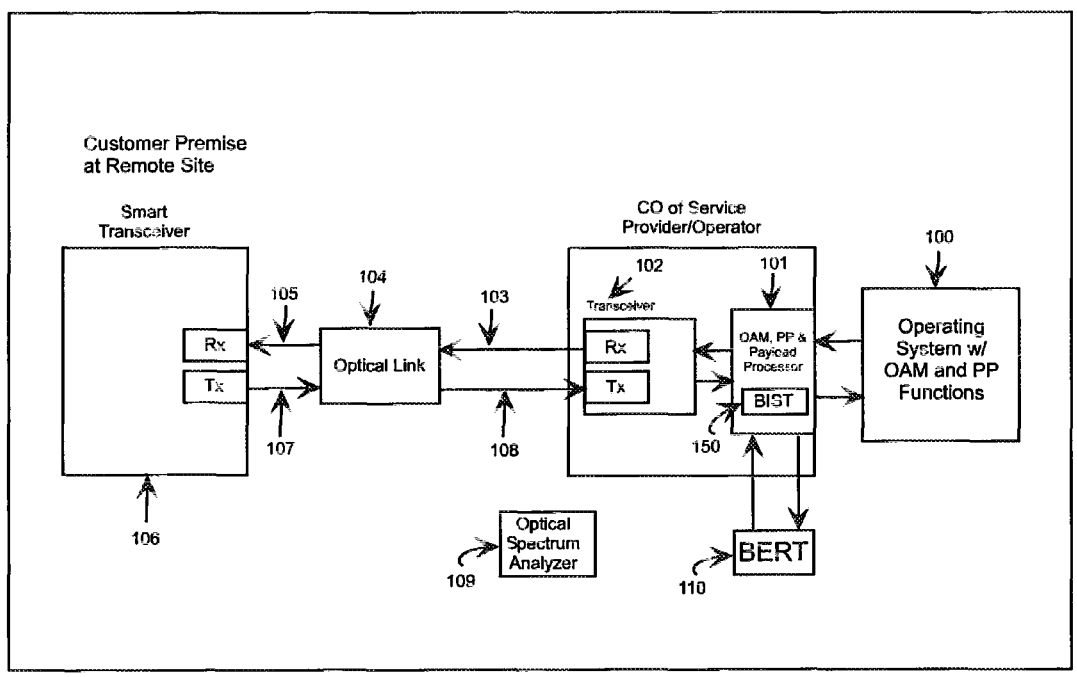
FIG. 1 shows a configuration for a scheme for remote control of the wavelength of a transmitter in a smart duplex transceiver.

As shown in FIG. 1, a scheme for remote control of the wavelength of a transmitter in a smart transceiver includes an operating system with OAM and PP functions 100, an OAM, PP & Payload Processor 101, a duplex transceiver 102, a pair of optical fiber jumpers 103 and 108, an optical link 104, a pair of optical fiber jumpers 105 and 107, and a smart duplex transceiver 106, an optical spectrum analyzer 109 and a BERT 110. The OAM, PP & Payload Processor 101 can execute a built-in-system-test (BIST) procedure 150.

Figure 2:
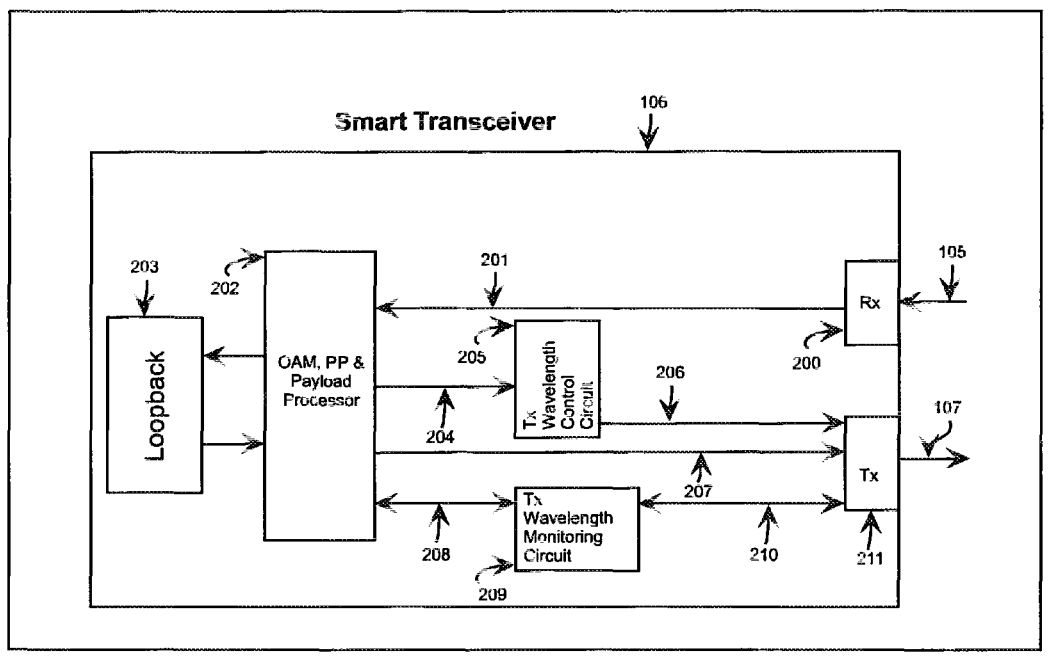
FIG. 2 shows a detail functional block diagram of a smart duplex transceiver.
Figure 3:
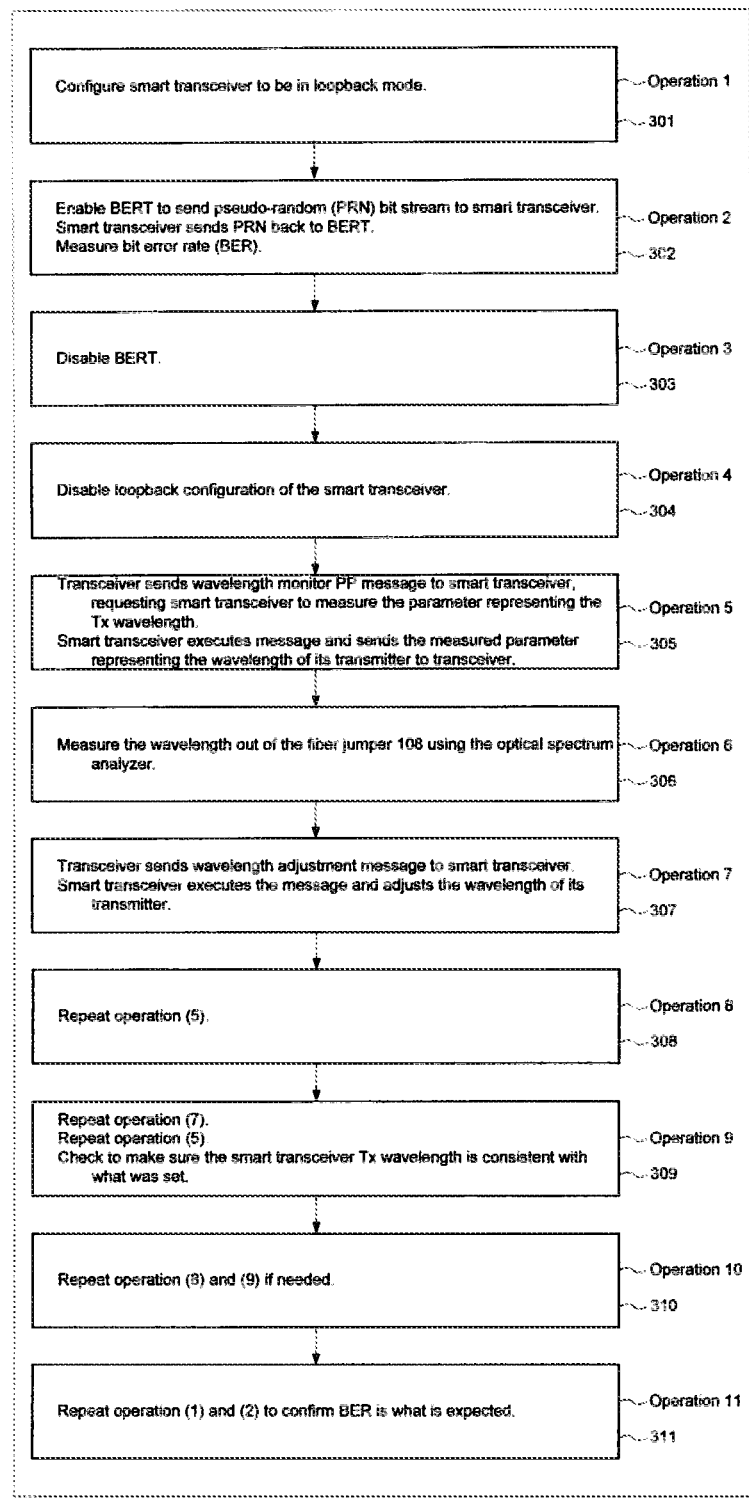
FIG. 3 shows a procedure for the remote control of the wavelength of a tunable transmitter in a smart transceiver.

As shown in FIG. 2, a smart duplex transceiver includes an optical receiver 200; an electrical path 201; an OAM, PP & Payload Processor 202; a Loopback circuit 203; an electrical path 204; a Tx wavelength control circuit 205; electrical paths 206, 207, and 208; a Tx wavelength monitoring circuit 209; an electrical path 210; and an optical transmitter 211.

The following is a procedure for the remote control of the wavelength of a transmitter in a smart duplex transceiver 106.

It is assumed, but not required, during this procedure that the transmission is error free in either direction, from the transceiver 102 to the smart transceiver 106, or from the smart transceiver 106 to the transceiver 102, because the PP messages of controlling the transmitter wavelength are to be exchanged between transceivers 102 and 106. This is typically met since almost all the systems in service are designed to run in error free region with even an extra system margin of few dB.

Sometimes the transmission with default settings of the communication system over the optical link 104 might not be error free. In this case, all the PP messages might need to be sent repeatedly to make sure that the PP messages are received correctly by the transceiver at the receiving side.

Operation One

The following is the first operation 301. It is necessary, first of all, to configure the smart duplex transceiver 106 in a loopback mode to find the bit error rate (BER) with the current settings of the transceiver. For this, a loopback OAM Protocol Data Unit (OAMPDU) generated at the operating system with OAM and PP functions 100 is sent to an OAM, PP & Payload Processor 101 where the loopback OAMPDU is encapsulated serially with the payload, if there is any. During this period, the output from the BERT 110 is disabled. The output is sent to the transceiver 102, where the electrical signal of the loopback OAMPDU message is converted into an optical signal. Then the optical signal of the loopback message is transmitted through the optical jumper 103, the optical link 104, and an optical jumper 105, and arrives at the smart duplex transceiver 106.

The optical signal arriving at the smart duplex transceiver 109 is then converted into an electrical signal at the receiver 200. The electrical signal is transmitted through the electrical path 201, and arrives at an OAM, PP & Payload Processor 202, where the loopback OAMPDU message is separated and executed. Now only the remaining payload, if there is any, passes through the OAM, PP & Payload Processor 202 and an electrical path 207, and arrives at the optical transmitter 211, where the electrical payload signal is converted into an optical signal.

The optical signal of the payload from the smart transceiver 106 is transmitted through an optical jumper 107, the optical link 104, and an optical jumper 108, and arrives at the transceiver 102 where the optical signal is converted into an electrical signal. The electrical signal transmits to the OAM, PP & Payload Processor 101. This completes the configuration in the loopback mode.

Operation Two

The following is the second operation 302. The output from the BERT 110 is enabled and a pseudo-random (PRN) bit stream is sent out at the same data rate of the communication system to the OAM, PP & Payload Processor 101. During this transmission period, there is no sending out of any OAMPDU's and PP's in the data stream. This pseudo-random data signal will be transmitted through the path described above during the preparation of the loopback mode and then will return to the error detector of the BERT for the BER measurement. The measured BER is recorded.

An alternative embodiment is as follows. A built-in-system-test (BIST) procedure 150 of the OAM, PP & Payload processor 101 is enabled and transmits a pseudo-random (PRN) bit stream to the smart transceiver 106. The smart transceiver 106 then transmits the PRN bit stream back to the OAM, PP & Payload processor 101 for bit error (BER) measurement. The measured BER is then recorded.

Operation Three

The following is the third operation 363. The output of the BERT 110 is disabled.

Operation Four

The following is the fourth operation 304. The loopback configuration of the smart transceiver 106 is disabled using the operation 1) above with a disable loopback OAM Protocol Data Unit (OAMPDU).

Operation Five

The following is the fifth operation 305. A wavelength monitoring PP message generated at the operating system with OAM and PP functions 100 is sent to the OAM, PP & Payload Processor 101. The output is sent to the transceiver 102 where the electrical signal of the wavelength monitoring PP message is converted into an optical signal. Then the optical signal of the wavelength monitoring PP message is transmitted through the optical jumper 103, the optical link 104, and an optical jumper 105, and arrives at the smart duplex transceiver 106. This PP message is for requesting the wavelength monitoring circuit 209 to measure the parameter representing the Tx wavelength and, for example, the Tx temperature, and then sending it to the transceiver 102 in another PP message generated in the transceiver 106.

The optical signal arriving at the smart duplex transceiver 106 is then converted into an electrical signal at the receiver 200. The electrical signal is transmitted through the electrical path 201 and arrives at the OAM, PP & Payload Processor 202, where the wavelength monitoring PP message is separated. An execution message of the wavelength monitoring PP message is sent to the Tx wavelength monitoring PP message circuit 209, which measures the parameter representing the wavelength of the transmitter 211 accordingly. The measured parameter representing Tx wavelength is processed in the OAM, PP & Payload Processor 202 and sent along the electrical path 207 to the transmitter 211, with the payload where it is converted into an optical signal.

The optical signal is transmitted through the optical jumper 107, the optical link 104, and the optical jumper 107, and arrives at the receiver of the transceiver 102 where the optical signal is converted back into an electrical signal. This signal is processed at the OAM, PP & Processor 101, and the measured parameter representing Tx wavelength is read out at the Operating System w/OAM and PP Functions 100. The parameter representing Tx wavelength is then recorded.

Operation Six

The following is the sixth operation 306. The wavelength out of the fiber jumper 108 is measured using the Optical Spectrum Analyzer 109.

Operation Seven

The following is the seventh operation 307. A wavelength adjustment PP message, a message that sets the Tx wavelength at a specified value, generated at the operating system with OAM and PP functions 100, is sent to the OAM, PP & Payload Processor 101. The output is sent to the transceiver 102, where the electrical signal of the wavelength adjustment PP message is converted into an optical signal. Then the optical signal of the wavelength adjustment PP message is transmitted through the optical jumper 103, the optical link 104, and an optical jumper 105, and arrives at the smart duplex transceiver 106.

The optical signal arriving at the smart duplex transceiver 106 is then converted into an electrical signal at the receiver 200. The electrical signal is transmitted through the electrical path 201 and arrives at an OAM, PP & Payload Processor 202, where the wavelength adjustment PP message is separated. An execution message of the wavelength adjustment is sent to the Tx wavelength control circuit 205, which adjusts the wavelength of the transmitter 211 accordingly.

Operation Eight

The following is the eighth operation 308. Operation 5) is repeated to read out the parameter representing Tx wavelength at the new setting. The parameter is recorded.

Operation Nine

The following is the ninth operation 309. Operation 7) is repeated. Operation 5) is repeated and the Tx wavelength is recorded. A check is done to see that the Tx wavelength is consistent with what was set or expected.

Operation Ten

The following is the tenth operation 310. Operation 3) and operation 9) are repeated if needed.

Operation Eleven

The following is the eleventh operation 311. Operation 1) and operation 2) are repeated. A confirmation is done to see if the measured BER is indeed what is expected.

In the foregoing specification, the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A dense wavelength division multiplexing (DWDM) communication system comprising:
   a smart small form-factor pluggable (SFP) transceiver located at a remote site, the smart SFP transceiver being configured to include a tunable transmitter and to support a loopback mode;
   an operating system configured to support Operation, Administration, and Maintenance (OAM) and Proprietary Protocol (PP) functions, communicatively coupled to an OAM, PP & Payload processor, and configured to remotely control a wavelength of a tunable transmitter of the smart SFP transceiver;
   a first transceiver coupled to the OAM, PP, and Payload processor, configured to exchange messages with the smart SFP transceiver over an optical link;
   a bit error rate test (BERT) unit communicatively coupled to the OAM, PP & Payload processor and configured to:
      transmit a pseudo-random (PRN) bit stream to the smart SFP transceiver, while the smart SFP transceiver is operating in the loopback mode, and
      receive the PRN bit stream back from the smart SFP transceiver for bit error rate (BER) measurement,
   wherein the smart SFP transceiver is configured to:
   receive a loopback configuration message over the optical link from the operating system to place the smart SFP transceiver in the loopback mode,
   receive the PRN bit stream over the optical link from the BERT unit and return the received PRN bit stream to the BERT unit during the loopback mode, receive a loopback disable message over the optical link from the operating system and configure the smart SFP transceiver to be out of the loopback mode;

receive a first message over the optical link from the first transceiver the first message including a request to measure a parameter representing a transmission wavelength of the smart SFP transceiver, measure the parameter of the smart SFP transceiver and transmit a response message including the measured parameter over the optical link, the measured parameter comprising information on temperature of the tunable transmitter of the smart SFP transceiver, and after receiving a wavelength adjustment message from the first transceiver, adjust the wavelength of the tunable transmitter of the smart SFP transceiver in accordance with the wavelength adjustment message such that the adjusted wavelength of the tunable transmitter of the smart SFP transceiver does not overlap with a wavelength of the first transceiver coupled to the OAM, PP & Payload processor;

wherein the first transceiver is configured to send the first message and the wavelength adjustment message to the smart transceiver until a predetermined BER is obtained.

2. The DWDM communication system of claim 1, wherein the communication system further comprises an optical spectrum analyzer.

3. The DWDM communication system of claim 1, wherein the smart SFP transceiver comprises a smart duplex small form-factor pluggable (SFP) transceiver.

4. The DWDM communication system of claim 1, wherein the smart SFP transceiver comprises a smart bidirectional small form-factor pluggable (BiDi SFP) transceiver.

5. The DWDM communication system of claim 1, wherein the smart SFP transceiver comprises: a smart single wavelength single fiber bidirectional small form-factor pluggable (SWSF BiDi SFP) transceiver or a smart single wavelength single fiber bidirectional small form-factor pluggable plus (SWSF BiDi SFP+) transceiver.

6. The DWDM communication system of claim 1, wherein the smart SFP transceiver comprises a smart duplex small form-factor pluggable plus (SFP+) transceiver.

7. The DWDM communication system of claim 1, wherein the smart SFP transceiver comprises a smart bidirectional small form-factor pluggable plus (BiDi SFP+) transceiver.

8. The DWDM communication system of claim 1, wherein the smart SFP transceiver comprises a smart duplex 10 gigabit small form-factor pluggable (XFP) transceiver.

9. The DWDM communication system of claim 1, wherein the smart SFP transceiver comprises a smart bidirectional 10 gigabit small form-factor pluggable (BiDi XFP) transceiver.

10. The DWDM communication system of claim 1, wherein the smart SFP transceiver comprises a smart single wavelength single fiber bidirectional 10 gigabit small form-factor pluggable (SWSF BiDi XFP) transceiver.

11. The DWDM communication system of claim 1, wherein the optical link comprises an optical link without optical amplifiers.

12. The DWDM communication of system claim 1, wherein the optical link comprises an optically amplified optical link.

13. The DWDM communication system of claim 1, wherein the OAM, PP & Payload Processor comprises an application specific integrated circuit (ASIC).

14. The DWDM communication system of claim 1, wherein the OAM, PP & Payload Processor comprises an integration of a plurality of integrated circuits.

15. The DWDM communication system of claim 14, wherein the integration of the plurality of integrated circuits comprises a micro-controller.

16. The DWDM communication system of claim 14, wherein the integration of the plurality of integrated circuits comprises a field programmable gate array (FPGA).

17. The DWDM communication system of claim 14, wherein the integration of the plurality of integrated circuits comprises a micro-controller and a field programmable gate array (FPGA).

18. A method for remotely controlling a wavelength of a tunable transmitter in a smart small form-factor pluggable (SFP) transceiver configured to operate in a dense wavelength division multiplexing (DWDM) communication system, the DWDM communication system being comprising the smart SFP transceiver configured to support a loopback mode, a first transceiver communicatively coupled to the smart SFP transceiver over an optical link, an Operation, Administration, and Maintenance (OAM), Proprietary Protocol (PP) & Payload processor which is communicatively coupled to the first transceiver and an operating system with OAM and PP functions, the method comprising:

enabling the loopback mode of the smart SFP transceiver;

transmitting a pseudo-random (PRN) bit stream to the smart SFP transceiver over the optical link, while the smart SFP transceiver is operating in the loopback mode;

receiving the PRN bit stream over the optical link for bit error rate (BER) measurement;

disabling the loopback mode of the smart SFP transceiver;

transmitting to the smart SFP transceiver over the optical link a first message from the first transceiver, the first message including a request to measure a parameter representing a transmission wavelength of the smart SFP transceiver;

responsive to the first message received from the first transceiver, transmitting over the optical link a response message including the measured parameter, receiving, at the smart SFP transceiver, a wavelength adjustment message over the optical link from the operating system;

in response to the received wavelength adjustment message from the operating system, adjusting the wavelength of the tunable transmitter of the smart SFP transceiver such that the adjusted wavelength of the tunable transmitter of the smart SFP transceiver does not overlap with a wavelength of the first transceiver coupled to the OAM, PP & Payload processor, and sending the first message and the wavelength adjustment message to the smart transceiver by the first transceiver until a predetermined BER is obtained.

19. A dense wavelength division multiplexing (DWDM) communication system comprising:

a smart small form-factor pluggable (SFP) transceiver including a tunable transmitter and configured to support a loopback mode;

an operating system with Operation, Administration, and Maintenance (OAM) and Proprietary Protocol (PP) functions communicatively coupled to an OAM, PP & Payload processor, configured to remotely control over an optical link a wavelength of the tunable transmitter of the smart SFP transceiver, wherein the OAM, PP & Payload processor configured to execute a built-in-system-test (BIST) operation to:

transmit a pseudo-random (PRN) bit stream over the optical link to the smart SFP transceiver, during the loopback mode of the smart SFP transceiver, and receive a PRN bit stream over the optical link from the smart SFP transceiver;

a first transceiver coupled to the OAM, PP & Payload processor and configured to exchange messages with the smart SFP transceiver over the optical link, wherein the smart SFP transceiver is configured to:

receive a loopback configuration message over the optical link to enable the loopback mode of the smart SFP transceiver;

receive the PRN bit stream over the optical link from the BIST operation and return the received PRN bit stream to the BIST operation;

receive a first message over the optical link from the first transceiver, the first message including a request to measure a parameter representing a transmission wavelength of the smart SFP transceiver, responsive to the first message from the first transceiver, measure the parameter of the smart SFP transceiver and transmit over the optical link a response message including the measured parameter including information on temperature of the tunable transmitter of the smart SFP transceiver, receive a wavelength adjustment message over the optical link from the operating system, and in response to the received wavelength adjustment message over the optical link from the operating system, adjust the wavelength of the tunable transmitter of the smart SFP transceiver such that the adjusted wavelength of the tunable transmitter of the smart SFP transceiver does not overlap with a wavelength of the first transceiver coupled to the OAM, PP & Payload processor;

wherein the first transceiver is configured to send the first message and the wavelength adjustment message to the first transceiver until a predetermined BER is obtained.

20. The DWDM communication system of claim 19, further comprising an optical spectrum analyzer.

21. The DWDM communication system of claim 19, wherein the OAM, PP & Payload Processor comprises an application specific integrated circuit (ASIC).

22. The DWDM communication system of claim 19, wherein the OAM, PP & Payload Processor comprises an integration of a plurality of integrated circuits.

* * * * *